(12) United States Patent
Vaughn (10) Patent No.: US 8,961,347 B2
(45) Date of Patent: Feb. 24, 2015

(54) COLD START CLUTCH FOR CVT TRANSMISSION

(75) Inventor: Corey Vaughn, Brimfield, IL (US)

(73) Assignee: Caterpillar Inc., Peoria, IL (US)

( * ) Notice: Subject to any disclaimer, the term of this patent is extended or adjusted under 35 U.S.C. 154(b) by 215 days.

(21) Appl. No.: 13/449,541

(22) Filed: Apr. 18, 2012

(65) Prior Publication Data

US 2013/0281244 A1    Oct. 24, 2013

(51) Int. Cl.
*F16H 47/04*    (2006.01)

(52) U.S. Cl.
USPC .................................. 475/72; 475/76; 475/78

(58) Field of Classification Search
CPC ......... F16H 47/04; F16H 39/00; F16H 39/04; F16H 39/42; B60K 17/04; B60K 17/08; B60K 17/10
USPC ..................................................... 475/72–83
See application file for complete search history.

(56) References Cited

U.S. PATENT DOCUMENTS

| | | | |
|---|---|---|---|
| 3,918,325 A * | 11/1975 | Frost ............................ | 475/82 |
| 3,979,972 A * | 9/1976 | Sakai et al. .................. | 475/81 |
| 4,341,131 A * | 7/1982 | Pollman ....................... | 475/81 |
| 5,174,109 A | 12/1992 | Lampe | |
| 5,667,452 A * | 9/1997 | Coutant ........................ | 475/81 |
| 6,007,444 A * | 12/1999 | Kinokami ..................... | 475/81 |
| 7,302,799 B2 | 12/2007 | Ummenhofer | |
| 7,530,914 B2 * | 5/2009 | Fabry et al. .................. | 475/82 |
| 7,771,311 B2 | 8/2010 | Graham et al. | |
| 2004/0139938 A1 | 7/2004 | Tanei et al. | |
| 2008/0155974 A1 * | 7/2008 | Aitzetmueller et al. ........ | 60/325 |
| 2011/0015022 A1 * | 1/2011 | Stoeckl et al. ................ | 475/83 |
| 2011/0077830 A1 | 3/2011 | Lochocki, Jr. et al. | |
| 2013/0068545 A1 * | 3/2013 | Cronin ......................... | 180/9.1 |

* cited by examiner

*Primary Examiner* — Tisha Lewis
(74) *Attorney, Agent, or Firm* — Miller, Matthias & Hull LLP (57) ABSTRACT

A continuously variable transmission (CVT) for a vehicle engine which provides enhanced cold starting and reduced wear under all conditions. The transmission includes mechanical transmission components, hydrostatic transmission components, and a clutch to decouple only the mechanical transmission components from driving engagement with the engine or other power source. Decoupling allows cold starting with significantly reduced parasitic losses. The transmission may use a hydraulic circuit to re-engage the mechanical transmission components with the input power source and full driving re-engagement of the transmission with the power source, such as an engine, after the transmission reaches a desired speed.

18 Claims, 5 Drawing Sheets

COLD START CLUTCH FOR CVT TRANSMISSION

TECHNICAL FIELD

The present application relates to the starting of vehicular machine engines particularly under cold (below zero degrees F.) start conditions and particularly relates to the starting of engines with combined mechanical and hydraulic transmissions such as with continuously variable transmissions (CVT).

BACKGROUND

Machines such as, for example, motor graders, wheel loaders, dozers, backhoes, dump trucks, and other heavy equipment are used to perform many tasks. To effectively perform these tasks, the machines require an engine that provides significant torque through a transmission to one or more ground engaging devices, such as the grader portion of a road grader. Often, these machines utilize continuously variable transmissions (CVT) for increased engine efficiency.

A CVT is an automatic type of transmission that provides an infinite number of output ratios within its ratio range. For example, a hydraulic CVT includes a pump and a fluid motor that receives pressurized fluid from the pump. Depending on a discharge flow rate and pressure of the pump, the motor speed and output torque at the ground engaging device may be varied.

CVT transmissions are becoming increasingly popular. The CVT allows the engine to maintain a narrow band of output velocities while varying the speed of the output drive shaft of the transmission. This allows the engine to run at more efficient revolutions per minute which can lead to better fuel economy than other transmissions. The CVT can also be used to maximize the performance of a vehicle by allowing the engine to turn at the RPM at which it produces peak power. In addition, the infinite gear ratios of a CVT allow for a smoother angular acceleration of the drive shaft than is possible with a traditional transmission which has a set number of discrete gear ratios. A disadvantage of the CVT is that it is traditionally configured without any decoupling devices, i.e., the transmission's input is always coupled to its output. Thus, the transmission continually transmits power from the engine to the vehicle, even during times when the engine is not capable of providing rated power, such as during startup of the engine.

In existing systems of vehicles such as motor graders, with direct drive transmissions, a cold start bypass system has been used to relieve oil system pressure on the drive train during a cold start of an engine. This cold start bypass results in lower transmission parasitic loss during a cold start and allows quicker starts and reduced possibility of engine starting damage.

However, a CVT transmission can contribute significantly more parasitic loss compared to the drive shaft during a startup. Simply relieving the hydraulic pressure on the drive train, as with the powershift cold start bypass system, does not provide the magnitude of parasitic loss reduction needed to reliably allow the engine to efficiently start.

A centrifugal clutch was initially considered as a way to reduce CVT transmission parasitic loss demands on a cold start up. However, designing a centrifugal clutch to achieve the significant parasitic loss reduction needed at very low engine speeds at cold start up would also render it susceptible to constant slippage and wear at normal operating conditions, resulting in premature failure.

Various decoupling clutches have been used in transmissions to relieve cold start problems, such as one described in U.S. Pat. No. 5,174,109. This patent describes a coupling/decoupling clutch that provides for complete engagement and disengagement between a gas turbine power source and the loads driven by the power source. The disadvantage of applying complete disengagement to a CVT is that when engagement is desired, a relatively complicated control system is needed to engage the hydrostatic system as well as the mechanical system. In addition, at startup, the lag time for bringing those systems up to speed is lengthy. This lag time is a distinct disadvantage for vehicles operating in real time with a CVT.

A power system such as an engine for a vehicle has a limited amount of torque capability during a starting event. If the downstream powertrain components draw too much torque, the engine may not start or some of the engine components may suffer from premature wear. This situation is greatly exacerbated under cold ambient conditions. There is a need for a transmission system and method for the starting of engines with combined mechanical and hydrostatic transmissions such as with continuously variable transmissions (CVT) that provides a simple, economical, yet effective means of unloading the engine during a start. This disclosure addresses that need.

SUMMARY

One embodiment of the present disclosure is a method. The method includes inputting power from an input power source to only a hydrostatic transmission component of a continuously variable transmission (CVT), accelerating an input portion of the hydrostatic component to a desired rotational speed, operating an output portion of the hydrostatic component to a desired speed, and engaging a clutch between the input power source and a mechanical transmission component of the CVT, whereby the input power is transmitted to an output of the CVT through both the hydrostatic transmission component and the mechanical transmission component.

Another embodiment of the disclosure includes a continuously variable transmission (CVT). The continuously variable transmission includes an input mechanical component, a hydrostatic transmission including an input portion connected with the input mechanical component, and an output mechanical component. The CVT also includes an intermediate mechanical component connected with the output mechanical component and a clutch comprising a driven member and a driving member connected with the input mechanical component and the intermediate mechanical component, wherein upon starting, the input mechanical component is connected only with the input portion of the hydrostatic transmission and after startup, the clutch connects the input mechanical component with the intermediate mechanical component.

Another embodiment of the present disclosure also includes a continuously variable transmission (CVT). The CVT includes an input drive shaft, a hydrostatic transmission connected with the input drive shaft, an output shaft, a planetary gear system connected with the output shaft, and a clutch comprising a driven member connected to the planetary gear system and a driving member connected with the input drive shaft, wherein upon startup, the input drive shaft is connected only with an input of the hydrostatic system and after startup, the input drive shaft is connected with both an input of the hydrostatic system and an input of the planetary gear system.

Various embodiments of the present disclosure may contain only a subset of the elements and advantages set forth. No one advantage is critical to the embodiments. Any claimed embodiment may be technically combined with any other claimed embodiment(s).

BRIEF DESCRIPTION OF THE DRAWINGS

The operation of the improved wear reducing and cold starting transmission will become more evident from the following discussion and drawings in which.

DETAILED DESCRIPTION

This disclosure relates to the starting of engines with combined mechanical and hydrostatic transmissions such as with continuously variable transmissions (CVT). A mechanical clutch is disclosed that provides a simple, economical, yet effective means of unloading the engine during a start. It does this by reducing the amount of inertia torque load from the mechanical portion of a transmission, such as a CVT transmission, within the powertrain during startup.

Figure 1:
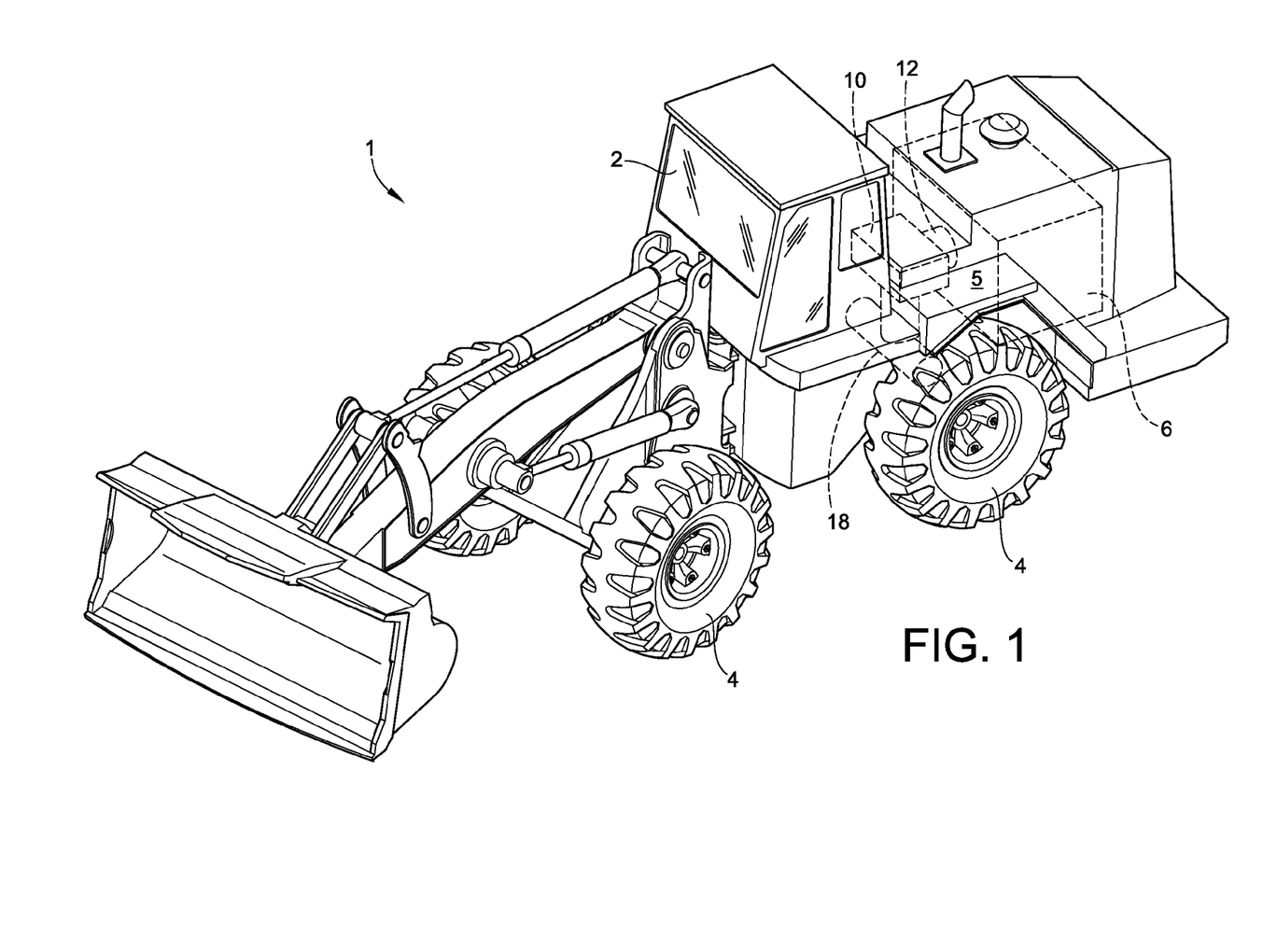
FIG. 1 is diagrammatic illustration of an exemplary disclosed machine.

FIG. 1 illustrates an exemplary machine 1 having multiple systems and components that cooperate to accomplish a task. The tasks performed by machine 1 may be associated with a particular industry such as mining, construction, fanning, transportation, power generation, or any other industry known in the art. For example, machine 1 may embody a mobile machine such as the wheel loader depicted in FIG. 1, a bus, a highway haul truck, or any other type of mobile machine known in the art. Machine 1 may include an operator station 2, one or more traction devices 4, and a power train 5 operatively connected to drive at least one of traction devices 4.

Operator station 2 may include devices that receive input from a machine operator indicative of a desired machine travel maneuver. These devices, their operation and operator station functionality are well known in the art. Traction devices 4 may embody wheels located on each side of machine 1 (only one side shown). Alternatively, traction devices 4 may include tracks, belts or other known traction devices. It is contemplated that any combination of the wheels on machine 1 may be driven and/or steered.

Power train 5 may be an integral package configured to generate and transmit power to traction devices 4. In particular, power train 5 may include a power source 6 operable to generate a power output, a transmission unit 10 connected to receive the power output and transmit the power output in a useful manner to traction devices 4, and a control module (not shown) configured to regulate the operation of transmission unit 10 in response to one or more inputs.

Power source 6 may include an internal combustion engine having multiple subsystems that cooperate to produce mechanical or electrical power output. For the purposes of this disclosure, power source 6 is depicted and described as a four-stroke diesel engine. One skilled in the art will recognize, however, that power source 6 may be any other type of internal combustion engine such as, for example, a gasoline or a gaseous fuel-powered engine. The subsystems included within power source 6 may include, for example, a fuel system, an air induction system, an exhaust system, a lubrication system, a cooling system, or any other appropriate system.

Transmission unit 10 may embody, for example, powershift transmission or a continuously variable transmission (CVT). Transmission unit 10 may be any type of continuously variable transmission such as, for example, a hydraulic CVT, a hydro-mechanical CVT, an electric CVT, or other configuration as would be apparent to one skilled in the art. In the exemplary CVT of FIG. 1, the CVT is a hydromechanical transmission unit. The power source 6 has an output shaft which is operatively coupled to the input shaft 12 of the transmission unit 10. Input shaft 12 provides input to the transmission unit and to a clutch system 20. The clutch system 20 engages and disengages shaft power from the engine to a planetary or other mechanical transmission unit 18. Machine 1 and transmission unit 10 may be controlled with hand controls or foot pedals (not shown) by an operator (not shown) in operator station 2.

Figure 2:
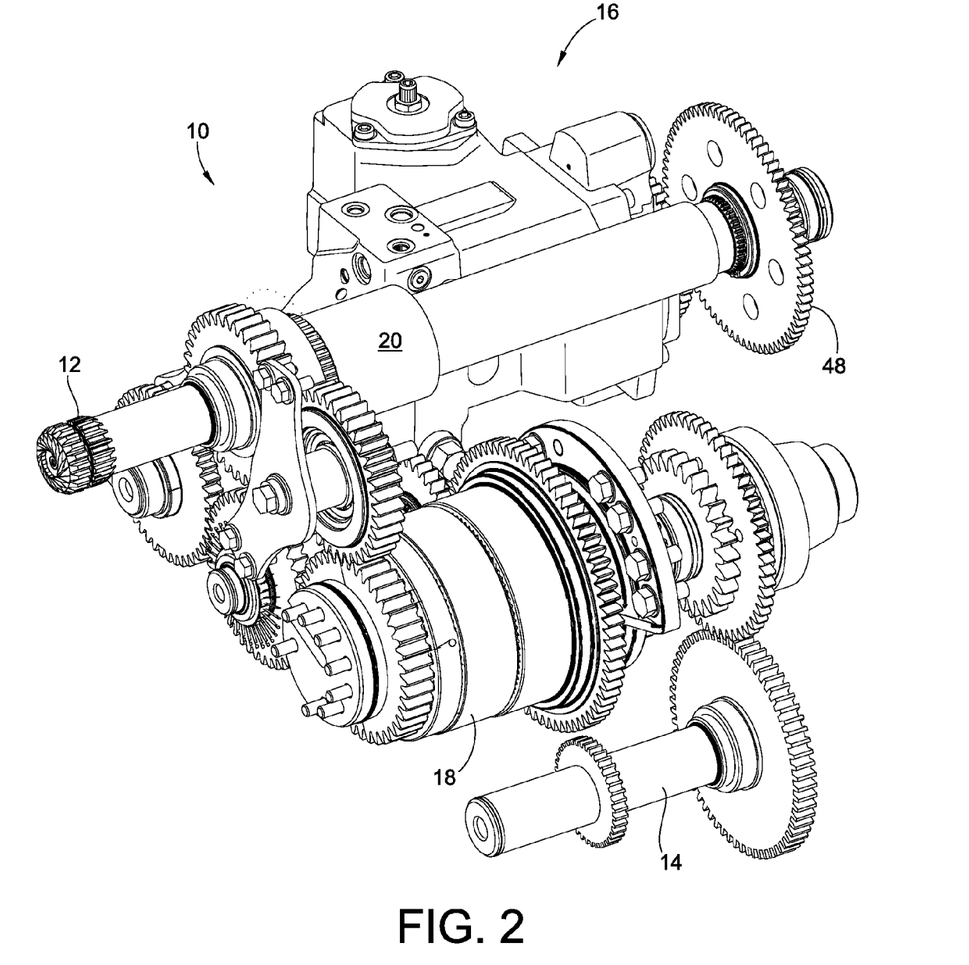
FIG. 2 is an isometric view of an embodiment of a continuously variable transmission.

FIG. 2 depicts an isometric view of a continuously variable transmission (CVT) according to this disclosure. The continuously variable transmission 10 is suitable for use in over the road or off-road applications, such as motor graders or other vehicles as disclosed in connection with FIG. 1. Transmission 10 includes an input drive shaft 12 and an output drive shaft 14. Power enters the transmission from the power source 6 (see FIG. 1) via the input drive shaft 12 and is routed through the transmission 10 as described below in a way that the speed of the output shaft 14 may be continuously changed over a narrow range of engine speeds to provide constant, useable power, better fuel economy, reduced emissions and a smoother driving experience. The driver of the vehicle is thus able to control the vehicle speed and manage the loads of the vehicle more efficiently.

Power enters CVT 10 via the input drive shaft 12, which is surrounded by a clutch system 20. The clutch system 20 may be, for example, a dog clutch, that includes a driven member 26 and a driving member 28, as shown in FIGS. 3-6. Power from the drive shaft 12 is split into power supplied to the hydrostatic system 16 and power supplied to a planetary gear system 18. In this example, the input drive shaft 12 incorporates the driving member 28, as seen later in the figures. The input drive shaft 12 is connected via output gear 48 to a hydrostatic system 16 of the transmission 10. Thus, the input power from the drive shaft 12 is transmitted to the hydrostatic system 16 at all times through the drive shaft output gear 48.

Transmission 10 includes a planetary gear system 18. The planetary gear system 18 is also connected to the output shaft 14 to transmit power to the loads, e.g., to the traction devices or propulsion system of the machine. Power is supplied to the planetary gear system 18, as will be more fully explained below, from both the hydrostatic system 16 and from the drive shaft 12. The planetary gear system 18 includes a driven member 26 that mates with a driving member 28 of the drive shaft 12 to supply power from power source 6 to planetary gear system 18. The planetary gear system 18 also includes a planetary ring gear 59 that adds the power supplied from the hydrostatic system 16 to the planetary gear system 18. This arrangement combines the output power from the hydrostatic system 16 with the split input mechanical power supplied by the clutch system 20 of the present disclosure to the planetary gear system 18. The combined hydromechanical power is then transmitted through output shaft 14.

The CVT depicted herein includes the hydrostatic system 16. The hydrostatic system 16, as noted above, is connected to the input power drive shaft 12 at all times through drive shaft output gear 48 and a meshing hydrostatic system input gear 49. The hydrostatic system 16 is also known as a variator. The variator, in this example, includes a variable displacement pump 52 fluidly connected to a fixed displacement motor 54. As is commonly known, the swashplate (arrow on pump 52), of the infinitely variable pump 52 can be stroked from a minimum to a maximum in order to vary the flow of hydraulic fluid to the pump 54. As explained more fully below, the system has a fixed input, such as the input from transmission drive shaft 12, but has an infinitely variable output. This allows the operator to automatically add more power or less power to the planetary system 18 and thus control the speed and amount of power furnished to the output shaft 14 by automatically applying different levels of hydraulic fluid pressure to the hydrostatic system 16. This combination advantageously provides smooth, continuous and uninterrupted power flow from the engine or power source as the vehicle accelerates and decelerates from rest to maximum speed and back. The power source 6 may be operated at or near its peak efficiency output speed, regardless of the vehicle speed or the transmission output speed.

Figure 3:
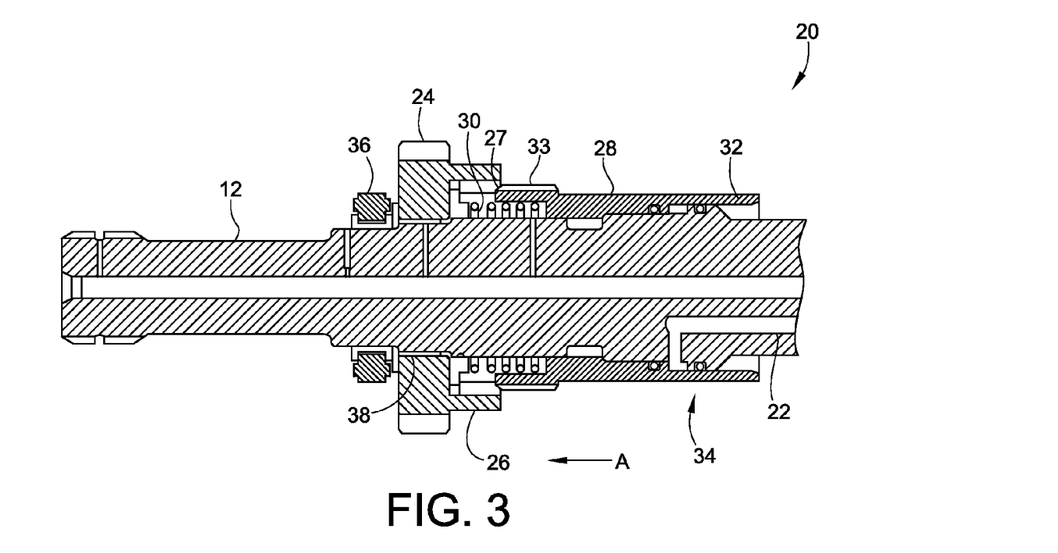
FIGS. 3 and 4 are schematic views of a disengaged state and an engaged state of a clutch used to actuate the continuously variable transmission of FIG. 1.
Figure 4:
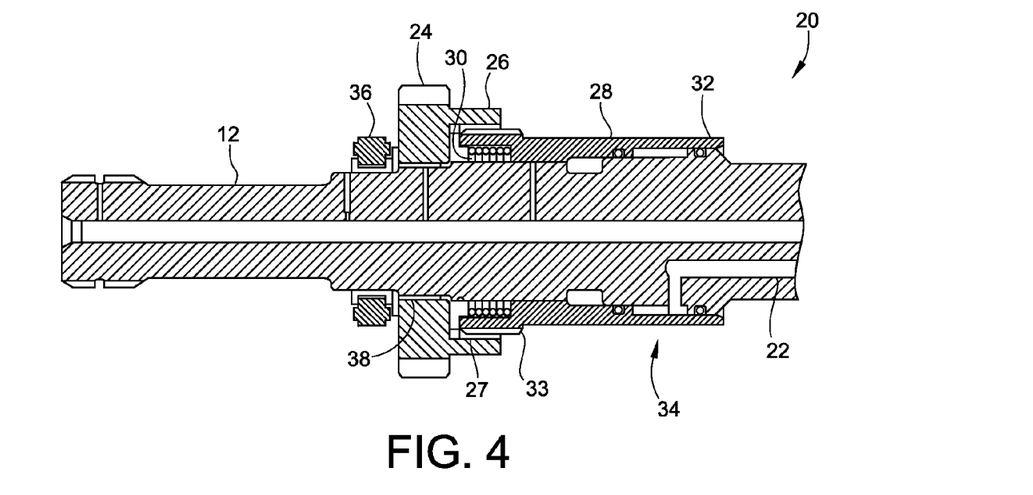

FIGS. 3-4 depict the cold start clutch system 20 of the CVT 10. In FIG. 3, the clutch system 20 is not engaged. Power enters via drive shaft 12, which is rotating. Clutch housing or piston 32 is co-axial with drive shaft 12 and is mounted drivingly surrounding the drive shaft 12. The piston 32 includes an internal spline (not shown) that mates with an external spline (also not shown) of the drive shaft 12. Thus, the piston 32 always rotates with the drive shaft 12 through the spline interface, whether or not the clutch system 20 is engaged. This combination constitutes driving member 28. The clutch system 20 also includes driven member 26, which is seen in the center portion of FIGS. 3-4. Driven member 26 includes a driven gear 24 which includes internal splines 27 which mate with the external splines 33 of the piston 32. When the clutch system 20 is engaged, rotating driving member 28/piston 32 with its external splines 33 engage the internal splines 27 of driven member 26/driven gear 24, engaging driven member 26 and causing driven member 26 to also rotate. This causes driven gear 24 to also rotate, thus supplying power to the planetary system 18 of FIG. 1. The assembly may also include bearings, such as cylindrical bearing 36 for supporting the input shaft 12 and sleeve bearings 38 to allow driven member 26 to rotate independently about input shaft 12 when the clutch system 20 is not engaged.

The clutch system 20 is engaged by actuating a hydraulic valve (not shown) to introduce fluid into a hydraulic passage 22 of a hydraulic circuit, urging driving member 28 leftward, as shown by the leftward pointing arrow A. When the driving member 28 is not engaged, as seen in FIG. 3, driving member 28 is further right than when the driving member 28 is engaged, as in FIG. 4. In FIG. 4, the clutch housing 32 is further to the left, causing the splines 27, 33 of the clutch system 20 to engage. O-rings 34 seal the hydraulic fluid in hydraulic passage 22 against leaking, thereby maintaining continual engagement of the clutch.

Spring 30 is mounted concentric with the drive shaft 12 and the clutch housing/piston 32, urging apart the driven member 26 and driving member 28. Thus, without a hydraulic force to engage the clutch system 20, the at-rest position of the clutch system 20 is the disengaged position shown in FIG. 3. The hydraulic force must be sufficient to overcome the resistance of spring 30 and to engage the driven member 26 with the driving member 28, as shown in FIG. 4. Power enters the transmission 10 and clutch system 20 from power source 6 (see FIG. 1) through input shaft 12 and in this view, leaves the clutch system 20 via driven gear 24, thus furnishing power to the planetary gear system 18.

Figure 5:
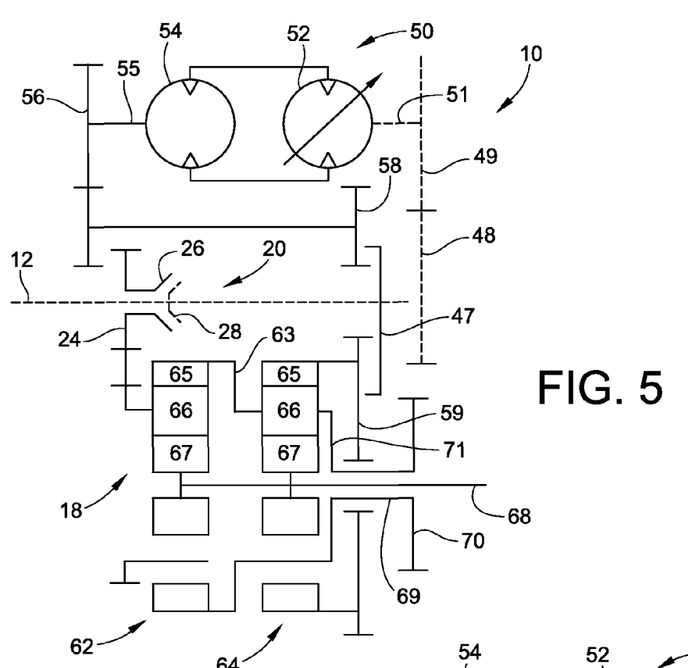
FIGS. 5 and 6 are schematic views depicting the flow of power in the continuously variable transmission of FIGS. 3 and 4.
Figure 6:
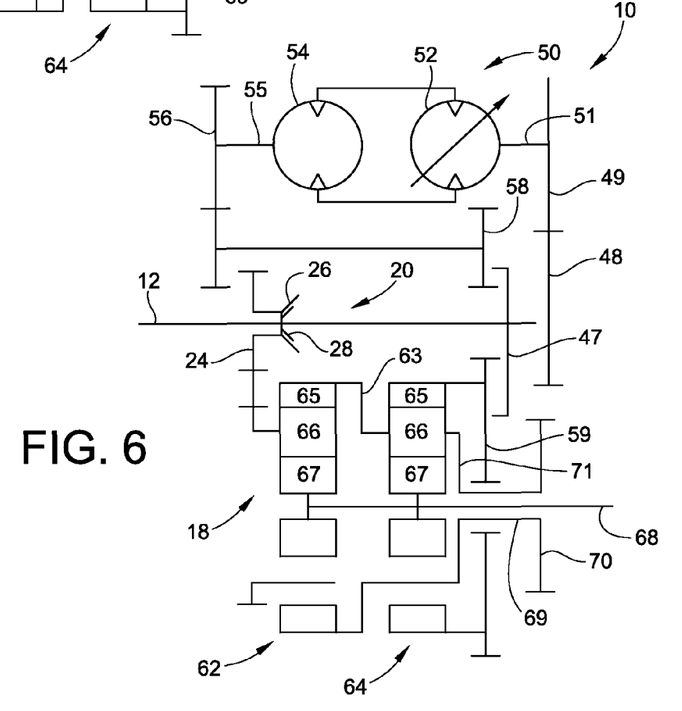

FIGS. 5-6 provide schematic views of the CVT 10 that correspond to the views of the clutch system 20 depicted in FIGS. 3-4. In FIG. 5, power enters the CVT 10 from power source 6 (see FIG. 1) through rotating drive shaft 12, to which is mounted driving member 28/piston 32 which is also rotating through the splined connection described above for the drive shaft 12/piston 32. Piston 32 also include external splines 33 for mating with internal splines 27 of driven member 26/driven gear 24 as described with respect to FIGS. 3-4. Drive shaft 12 mounts an output gear 48 which meshes with hydrostatic system input gear 49.

Hydrostatic system or variator 50 includes a variable portion or pump 52 and a fixed portion or motor 54. Pump and motor systems are well known to those skilled in hydrostatic arts and are described here for completeness and a better understanding of the functioning of the CVT 10. Note that in this start-up phase, clutch system 20 includes driven member 26 with internal splines 33 which have not yet engaged the external splines 27 of driving member 28. At the actual engine start-up, power flows only through the dashed lines in FIG. 5. Power flows through drive shaft 12, output gear 48, input gear 49 and hydrostatic system input shaft 51. At start up, there is no output from the hydrostatic system 50. Later, when power is output from the hydrostatic system 50 and is supplied to the planetary system 18, at least some portions of the planetary system 18 also rotate to provide power to output shaft 68, connecting sleeve 69, output gear 70 and carrier 71.

Planetary system 18, in this embodiment, includes two planetary gear sets 62, 64 with desired numbers of teeth and ratios. Each gear set includes a ring gear 65, planet gear 66 and sun gear 67. Output is provided through shaft 68 connected to the sun gears 67 of the first and second planetary gear sets 62, 64 and carrier 71 connecting sleeve 69 to output gear 70. Carrier 63 links ring gear 65 of the first planetary gear set to planet gear 66 of the second planetary gear set 64. Input to the planetary system 18 is split between the contributions from the hydrostatic portion 16 through planetary ring gear 59 to the second planetary gear set 64 and the mechanical contribution through driven gear 24 to the planet gear 66 of the first planetary gear system 62.

Hydrostatic system input gear 49 drives an input shaft 51 to pump 52 in which is mounted a generally-cylindrical block having a plurality of cylinders and pistons (not shown). The pistons reciprocate in the cylinders while the block rotates. Each piston reciprocates between the bottom of the cylinder in which it is mounted and an external swashplate within the pump portion. The swashplate is independently controlled and may be tilted to an infinitely variable desired angle. The greater the angle of the swashplate, the further each piston travels in its cylinder as the block rotates. The further each piston travels, the more hydrostatic fluid it pumps through an orifice or orifices in the bottom of its cylinder. This portion of the hydrostatic system is known as the variable portion because the position of the swashplate is variable. By selecting the angle of the swashplate, its output power is also variable. Because it pumps hydrostatic fluid, it is also known as the pump portion. Because the angle of the swashplate is infinitely variable, the output power of the variable portion is also infinitely variable.

The hydrostatic fluid is pumped by the pump 52 to the other portion of the hydrostatic system 16, the motor 54. The internal structure of the motor 54 is identical to that of the pump 52, except that the swashplate angle for the motor 54 is fixed and cannot be adjusted. Thus, this portion is known as the fixed portion. With the angle of the swashplate fixed, it can only output the same amount of power that was input, less mechanical losses. Its output power is not variable but is fixed, i.e., set to the amount of power that is input.

As the power source 6, such as an engine, starts, little power is available. The swashplate is desirably set to a very shallow angle at the start, typically until the engine reaches a desired idle speed. At this angle, very little fluid is displaced by the pump portion 52 and the load from the hydrostatic system 50 is low, while the power source 6, such as an engine, starts and reaches a desired minimal speed. After this idle speed is achieved, the angle of the swashplate can be increased, to displace more fluid and to energize the motor portion 54 of the hydrostatic system 16 and through it, begin synchronization of the mechanical portion of CVT 10.

As fluid is displaced from the pump portion 52, the hydrostatic forces act in reverse on the motor portion 54, causing the pistons of the motor portion 54 to reciprocate in their cylinders and causing the block of the fixed portion to rotate. An output shaft 55 is typically mounted to the block within motor portion 54 to output the power. The output shaft 55 turns output gear 56 and the motor portion 54 thus outputs power. This portion is known as the fixed portion or the motor portion 54, because it receives fluid power from the pump 52, causing it to rotate and output power, as would a motor.

As seen in the top portion of FIG. 5, output gear 56 connects with an output gear 58 and to a planetary ring gear 59 to the planetary gear system 18, thus transmitting power from the variator to the planetary system 18. A mechanical connection 47 is shown between the output gear 58 and planetary ring gear 59. This connection may be an actual link, such as a gear, or may be symbolic, because the two-dimensional representations of FIGS. 5-6 make it difficult to accurately depict the meshing of gears 58, 59 with each other. In this embodiment, power is input from the drive shaft 12 or input power source only to the hydrostatic portion 50 of the CVT 10. Power is transmitted from the hydrostatic portion 50 to the planetary system 18, also known as the mechanical portion, but at this point no input power from the input source or drive shaft 12 is connected directly to the planetary or mechanical portion.

While the hydrostatic portion 50 has been activated, the only power at this point being sent to planetary system 18 is the power from the variator 50. Thus, gear 24 will begin to rotate, but the rotation at the start will be slow. As the transmission 10 warms up, the swashplate of the variable portion 52 will be turned to a greater and greater angle, thus increasing the fluid pumped and the power to the output gear 56 and ultimately to gear 24. The variator 50 thus increases its output before the clutch system 20 is engaged, minimizing parasitic losses. This point may also be described as taking place just before the clutch system 20 is engaged, which is also referred to herein as the clutch pre-engagement state.

When the output shaft speed has reached a desired speed, the transmission 10 may cause the clutch system 20 to engage. In this schematic, the clutch system 20 includes driven member 26 and driving member 28. As described above, a separate hydraulic circuit, not part of the hydrostatic system 50, translates the driving member 28 and engages the driven member 26 with the driving member 28. Thus, as seen in FIG. 6, the clutch system 20 is engaged. This completes the portion of the startup that includes clutch engagement.

With the clutch system 20 engaged, the schematic of FIG. 6 applies. Power may flow through all the lines as shown in FIG. 6. Planetary system 18 now receives power directly from the drive shaft through driven gear 24, as well as the power from the variator 50. In this embodiment, the planetary gear system 18 is used to combine the contributions. The transmission 10 adjusts the speed of the vehicle by varying the output of the variator portion. The present disclosure thus allows for smooth and continuous power flow and the engine may be operated at or near its peak efficiency output speed, regardless of the vehicle speed.

As noted above, when the engine starts, the drive shaft 12 connects directly only to the variator portion of the transmission 10. Thus, upon start up, the drive shaft 12 receives only the load imposed by the variator portion. If the swashplate is set to a very shallow angle, the load on the drive shaft or input power source is minimal. This allows the engine to start up with minimal torque requirements on the drive shaft and on the engine starting system. As the engine and the transmission warm up, the swashplate angle can be increased, speeding up the variator output and supplying power to the planetary system. This also increases the torque load on the drive shaft, but the increase is controlled and gradual. When the output shaft speed or other selected component of the planetary system is within a desired speed range, the clutch can be engaged. Thus, the torque load is managed and parasitic losses upon startup are minimized.

INDUSTRIAL APPLICABILITY

Vehicles such as motor graders, with direct drive transmissions, have been utilized with a cold start bypass system to relieve oil system pressure on the direct drive transmission. This cold start bypass results in lower transmission parasitic loss during a start and allows quicker starts and reduced possibility of engine damage.

Because of high fuel costs, the current trend is to replace direct drive transmissions with fuel conserving transmissions and particularly CVT transmissions with combined hydrostatic and mechanical components. However, the powershift direct drive cold start bypass solution cannot be directly applied to CVT transmissions due to the CVT's hydrostatic system pressure already being inherently low.

CVT transmissions are becoming increasingly popular since their inclusion enables the use of smaller displacement engines, due to their ability to allow the engine to operate in a narrow speed range. The smaller displacement engine and narrow operating range can result in significant fuel savings for machines equipped with a CVT transmission. CVT transmissions are being increasingly included in vehicles to capture fuel savings for increased customer value.

However, the CVT transmission can contribute significantly more parasitic loss compared to the direct drive during engine start up. Simply relieving pressure, as with the cold bypass system of a powershift direct drive transmission, does not provide the magnitude of reduction required to reliably allow the engine to start.

Vehicles having CVT transmission require a significant torque reduction at very low engine speeds. Designing a centrifugal clutch to achieve that reduction at cold start up would also render it susceptible to constant slippage and wear during normal operation.

Decoupling of the mechanical component of the CVT transmissions at start up, with the clutch mechanism disclosed herein, provides an economical and effective way to reduce engine and transmission wear particularly under ambient cold start condition, and facilitates the start up cranking.

Figure 7:
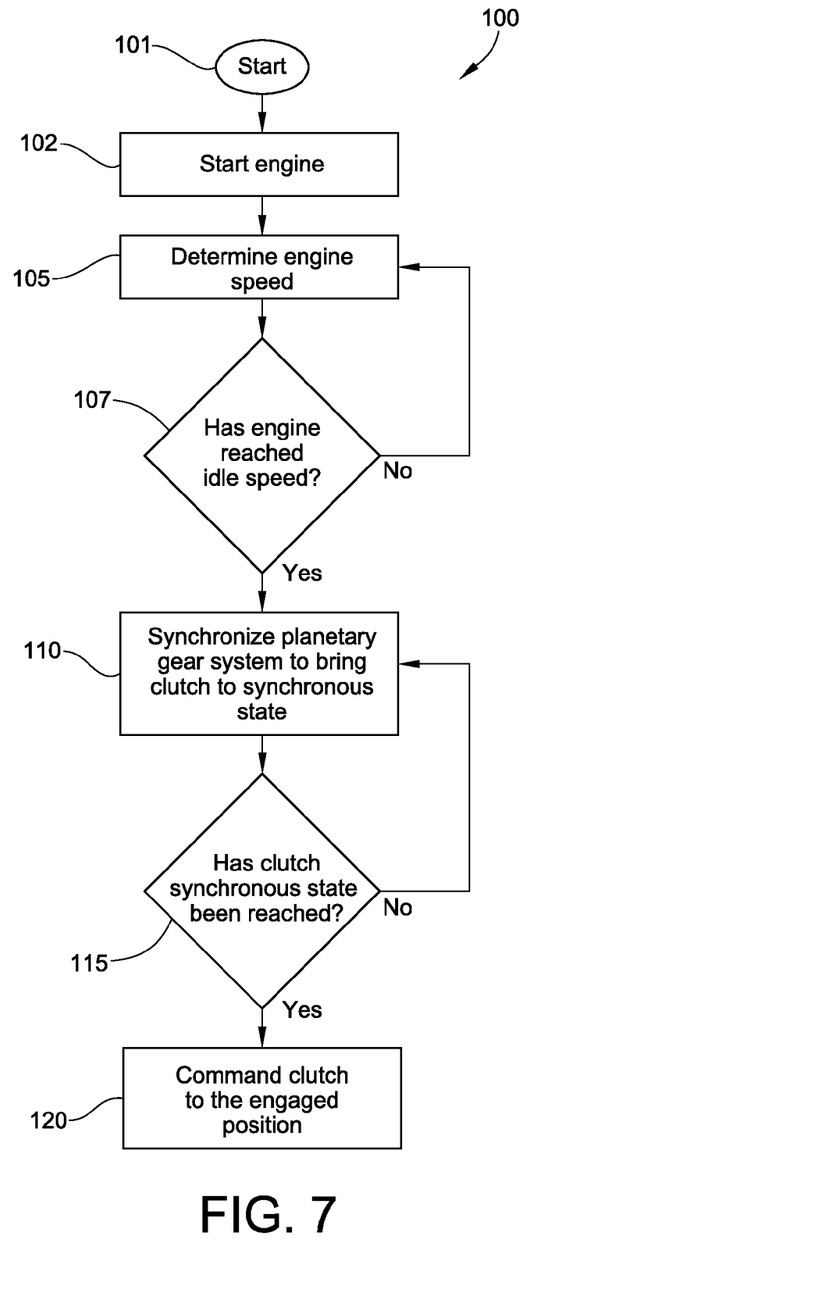
FIG. 7 shows a process control flowchart for the continuously variable transmission of this disclosure.

FIG. 7 shows the controlled start-up process 100 for the CVT transmission of this disclosure. The process starts at step 101. At step 102, the engine of a machine using the transmission of this disclosure is started. At step 105, the process determines the engine speed. At step 107, if the engine speed has not reached idle, the process returns to step 105 to determine the engine speed. During the time that the engine is speeding up to idle speed, the hydrostatic or variator portion of the CVT is engaged, but as described above, the variable swashplate is turned to a shallow angle. Thus, very little fluid is pumped and very little power is input into the variator portion and very little power is consumed by the variator. The power input is then gradually increased.

Once the engine has reached idle speed, the process advances to step 110 where the CVT transmission of this disclosure adjusts the planetary gear system speed to bring the clutch to the pre-engagement "synchronous" state, wherein the clutch driven member 26 and driving member 28 rotate at or near the same speed. This is accomplished by gradually turning the variable swashplate to a steeper angle, thus increasing the mechanical output of the variator. As described above, the pump portion of the pump and motor system then increases its output, as does the motor portion. The output power of the variator is transferred to a planetary gear of the planetary system, thus causing the components of the planetary gear system to rotate. Typically, one or more gear or shaft of the planetary gear system is monitored until it reaches a sufficient speed.

At step 115 the system determines whether the clutch pre-engagement state, i.e., the synchronous speed, is reached. If the clutch pre-engagement state has not been reached, the process returns to step 110 to adjust the planetary gear speed. If the clutch pre-engagement state has been reached, the process advances to step 120 where the clutch is commanded to the engaged position. At this point, the clutch is placed into the fully engaged clutch state by the separate hydraulic circuit described above and the machine is now in normal operating mode.

As an example of a transmission and vehicle for which the mechanical clutch of the present application is effectively utilizable, some Caterpillar transmission, such as CVT transmissions for construction equipment, combine hydrostatic and mechanical power through a planetary group that results in a continuously variable output on the transmission. The hydrostatic portion of the transmission inherently adds to the parasitic loss of the transmission relative to the direct drive transmission that is used in production today. In addition, the mechanical hookup of some of these transmissions can result in significant torque at the engine due to large amount of mechanical mass that is being rotated during an engine start. The cold start clutch of the present application then "decouples" the mechanical portion of the transmission during a start. This decoupling results in a significant decrease in torque attributable to the mechanical portion. This decrease, more than half the previous torque load, is sufficient to alleviate engine and transmission stress during cold starting and facilitates engine start up.

The clutch, however, does not decouple the transmission's hydrostatic transmission component, also known as a variator. The engine is started and then reaches a steady state condition at low idle with the input power or drive shaft driving the variator. While this is taking place, the input or pump portion of the pump and motor is rotating and is positioned for minimum load to minimize starting torque. After startup, the moveable swashplate of the pump portion will gradually be tilted in order to increase its output, as well as that of the output portion of the variator. The output of the variator is increased so that it may bring the planetary components to a speed wherein the cold start clutch members are synchronized. Once the requirements are met for synchronizing, an electro-hydraulic valve is commanded to move the cold start clutch to an engaged state. At this point, the transmission is receiving and summing power from both its mechanical and hydrostatic portions.

Operationally, the mechanical clutch is disengaged, for example with spring loading, when the engine is not powered. The hydrostatic or variator portion of the transmission is powered during a start. The output of the variator is transmitted to the planetary gear system, which thus begins to rotate slowly, after a sufficient engine idle speed is achieved. The output of the hydrostatic system is then gradually increased and the transmission achieves a stable pump pressure. By this time, the planetary gear system or mechanical portion of the CVT is also rotating at a relatively slow speed. The speed is slow because this system is powered only by the hydrostatic portion, not by the drive shaft. The clutch connecting the planetary gear system or other mechanical portion, is still disengaged. The hydrostatic portion adjusts its output, i.e., speeds up, to bring the planetary system to a desired speed.

When the clutch reaches a synchronous state, the clutch is engaged. The clutch is commanded to engage for example, by a control circuit that allows hydraulic fluid to move the piston and engage the clutch. The transmission then operates with power contributions from both the hydrostatic and mechanical input portions of the CVT. The output from the CVT may then be used as an input to an auxiliary power system, e.g., to drive an implement on the machine. The output may also be used as an input to a standard multi-speed transmission, e.g., a two speed or three-speed transmission for propelling the machine.

In one embodiment, the speeds of both the input shaft and the one or more gears in the planetary system are continuously monitored. If a sufficient differential develops, e.g., when the vehicle is stopped, the clutch may be disengaged by reducing the pressure of hydraulic fluid that maintains engagement of the driving member with the driven member.

It is understood that the above description and specific examples are merely illustrative and that changes may be made to the transmission and transmission containing system structure as well as to operative steps in the method of controlling start up operation without departing from the scope of the disclosure as defined in the following claims.

What is claimed is:

1. A method, comprising:
inputting power from an input power source via a drive shaft having a driving member of a clutch mounted thereto to only a hydrostatic transmission component of a continuously variable transmission (CVT);
accelerating a variable input portion of the hydrostatic transmission component to a desired rotational speed;
operating an output portion of the hydrostatic transmission component to a desired speed, wherein a mechanical transmission component of the CVT has a first planetary gear set and a second planetary gear set connected by a carrier, and the output portion of the hydrostatic transmission component is operatively connected to the second planetary gear set whereby the input power is transmitted to an output of the CVT through the second planetary gear set; and
engaging the clutch to engage the driving member of the clutch and a driven member of the clutch operatively connected to the first planetary gear set of the mechanical transmission component of the CVT when the driven member rotates at a synchronous speed that is approximately equal to an idle speed of the driving member and the drive shaft, whereby the input power is transmitted to the output of the CVT through the first planetary gear set of the mechanical transmission component when the clutch is engaged, and wherein the output portion of the hydrostatic transmission component is operatively connected to the first planetary gear set only through the carrier connecting the first planetary gear set and the second planetary gear set.

2. The method of claim 1, wherein the step of inputting power to only the hydrostatic transmission component comprises inputting power to the variable input portion of the hydrostatic transmission component.

3. The method of claim 1, further comprising adjusting a stroke of the variable input portion of the hydrostatic component to achieve the desired speed.

4. The method of claim 1, wherein the mechanical transmission component comprises a planetary gear system, and further comprising adjusting an output speed of the CVT by operating the planetary gear system.

5. The method of claim 1, further comprising adjusting an output speed of the CVT by operating the hydrostatic transmission component.

6. The method of claim 1, further comprising starting a vehicle using the CVT and operating the vehicle using the CVT.

7. The method of claim 1, further comprising engaging the clutch using hydraulic force and disengaging the clutch using a spring.

8. A continuously variable transmission (CVT), comprising:
an input mechanical component;
a hydrostatic transmission comprising an input portion connected with the input mechanical component and an output portion;
an output mechanical component;
an intermediate mechanical component connected with the output mechanical component, wherein the intermediate mechanical component comprises a first planetary gear set and a second planetary gear set, with the first planetary gear set being connected to the second planetary gear set by a single carrier and connected to the output mechanical component, and the second planetary gear set being operatively coupled to the output portion of the hydrostatic transmission and to the output mechanical component, and wherein the output portion of the hydrostatic transmission component is operatively connected to the first planetary gear set only through the carrier connecting the first planetary gear set and the second planetary gear set; and
a clutch comprising a driven member operatively coupled to the first planetary gear set and a driving member connected with the input mechanical component, wherein upon starting, the input mechanical component is connected only with the input portion of the hydrostatic transmission and after startup, the clutch connects the input mechanical component with the first planetary gear set of the intermediate mechanical component.

9. The CVT according to claim 8, wherein the intermediate mechanical component comprises a planetary gear system.

10. The CVT according to claim 8, wherein the input mechanical component is selected from the group consisting of an input shaft and an input gear.

11. The CVT according to claim 8, wherein the output mechanical component is selected from the group consisting of an output shaft and an output gear.

12. The CVT according to claim 8, wherein the hydrostatic transmission input portion comprises a variable displacement pump and a fixed displacement motor.

13. The CVT according to claim 8, wherein the driven member is connected to the intermediate mechanical component and the driving member is connected with the input mechanical component.

14. A continuously variable transmission (CVT), comprising:
an input drive shaft;
a hydrostatic transmission connected with the input drive shaft and having an output gear;
an output shaft;
a planetary gear system comprising a first planetary gear set and a second planetary gear set connected by a single carrier, with the first planetary gear set and the second planetary gear set being connected with the output shaft and the output gear being connected to the second planetary gear set and only connected to the first planetary gear set through the carrier; and
a single clutch between the input drive shaft and the planetary gear system comprising a driven member connected with the first planetary gear set of the planetary gear system and a driving member connected with the input drive shaft, wherein upon startup, the input drive shaft is connected only with an input of the hydrostatic system and after startup, the input drive shaft is connected with both an input of the hydrostatic system and the first planetary gear set of the planetary gear system.

15. The CVT according to claim 14, further comprising a spring for urging apart the driven and driving members and a hydraulic circuit for urging together the driven and driving members.

16. The CVT according to claim 14, further comprising a two-speed or three speed transmission that receives an output from the CVT.

17. The CVT according to claim 14, wherein the clutch further comprises a piston with an internal spring, the piston connected to and actuated by a hydraulic circuit.

18. The CVT according to claim 14, further including an engine for powering the CVT and further including a machine for housing the CVT and the engine.

* * * * *